United States Patent

Tenpaku et al.

Patent Number: 5,956,685
Date of Patent: Sep. 21, 1999

[54] SOUND CHARACTERISTIC CONVERTER, SOUND-LABEL ASSOCIATION APPARATUS AND METHOD THEREFOR

[75] Inventors: Seiichi Tenpaku, Minoh; Yoh'Ichi Tohkura, Soraku-gun, both of Japan

[73] Assignees: Arcadia, Inc.; ATR Human Information Processing Research Laboratories, Co., Inc., both of Japan

[21] Appl. No.: 08/815,306

[22] Filed: Mar. 11, 1997

Related U.S. Application Data

[63] Continuation of application No. PCT/JP95/01806, Sep. 12, 1995.

[30] Foreign Application Priority Data

Sep. 21, 1994 [JP] Japan .................................. 6-217006

[51] Int. Cl.⁶ .................................................. G01L 3/02
[52] U.S. Cl. .................... 704/278; 704/223; 704/265; 704/214; 348/738; 360/13
[58] Field of Search ........................ 704/278, 214, 704/221, 223, 265; 369/47; 360/13; 348/738

[56] References Cited

U.S. PATENT DOCUMENTS

| | | | |
|---|---|---|---|
| 4,868,687 | 9/1989 | Penn et al. ........................ | 360/13 |
| 5,086,475 | 2/1992 | Kutaragi et al. .................. | 704/265 |
| 5,335,073 | 8/1994 | Yamamoto ......................... | 348/738 |
| 5,521,330 | 5/1996 | Kuwano ............................ | 84/662 |
| 5,675,709 | 10/1997 | Chiba .............................. | 704/278 |
| 5,684,768 | 11/1997 | Terasaki et al. ................. | 369/47 |
| 5,692,099 | 11/1997 | Takahashi et al. .............. | 704/212 |
| 5,727,121 | 3/1998 | Chiba et al. ..................... | 704/214 |

Primary Examiner—David R. Hudspeth
Assistant Examiner—Vijay B. Chawan
Attorney, Agent, or Firm—Darby & Darby, P.C.

[57] ABSTRACT

This invention relates to converting the characteristics of sounds such as voices, musical tones, natural sounds, and so on, and more specifically to facilitating the conversion operation, and also to sound-label association suitable for the characteristic conversion. Various embodiments of the invention comprise several of the following elements to provide useful results: sound-label data holding means, display control means, conversion means, sound-label dividing means, label-data dividing means, association forming means, data inputting means, and communication means. Other embodiments of the invention may be practiced as processes or articles of manufacture.

41 Claims, 19 Drawing Sheets

FIG.6
| { Hi } | ADRS1 |
|---|---|
| { my name is John } | ADRS2 |
| { Nice to meet you } | ADRS3 |
FIG.7
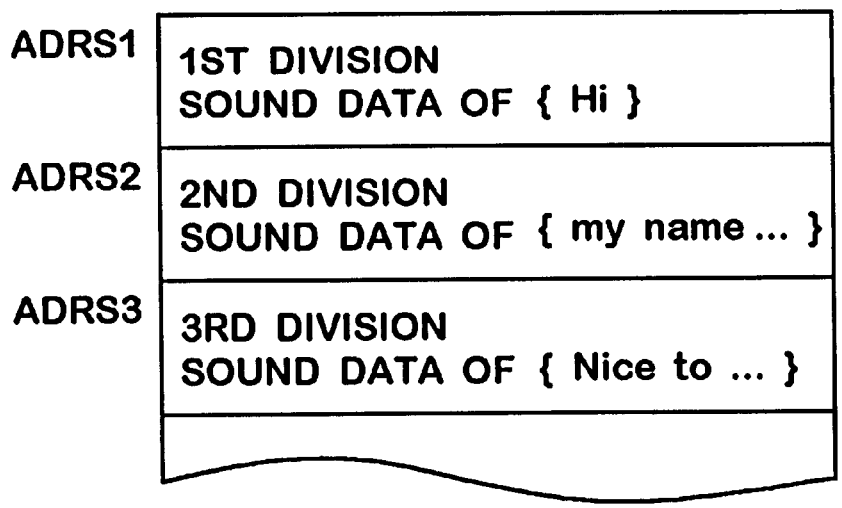
FIG.8
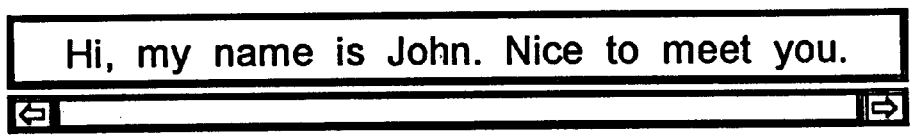

FIG.9

| MODIFICATION | SOUND QUALITY CONVERSION |
|---|---|
| BOLDFACE | INCREASE IN POWER |
| ITALIC | INCREASE IN PITCH |
| UNDERLINE | VIBRATO |
| CHARACTER SIZE | CHANGE DURATION OF SOUND ACCORDING TO CHARACTER SIZE |
| COLOR BRIGHTNESS | ASSOCIATE WITH CLEARNESS OF SOUND |
| ⋮ | ⋮ |

| { Hi }                       | ADRS1 |
| ---------------------------- | ----- |
| \BOLD { my name is John }    | ADRS2 |
| { Nice to meet you }         | ADRS3 |

ORIGINAL WAVEFORM

1020ms                                           1025ms

WAVEFORM OF CHANGED PITCH

1150ms                                           1175ms

ORIGINAL WAVE
(Hi, my name is John. Nice to meet you.)

WAVEFORM OF CHANGED POWER
(Hi, my name is John. Nice to meet you.)

ORIGINAL WAVEFORM (Hi, my name is John. Nice to meet you.)

WAVEFORM OF CHANGED DURATION (Hi, my name is John. Nice to meet you.)

WAVEFORM WITH VIBRATO (AMPLIFICATION MODIFICATION)

(Hi, my name is John. Nice to meet you.)

FIG.22

\FEMININE { ohayougozaimasu } \MASCULINE { gokigeNikagadesuka }

FIG.23

| \ BOLD \ ITALIC \ 25POINT | A |
|---|---|
| \ UNDERLINE \ 10.5POINT | B |
| ⋮ | ⋮ |

SOUND CHARACTERISTIC CONVERTER, SOUND-LABEL ASSOCIATION APPARATUS AND METHOD THEREFOR

This is a continuation of PCT/JP/95/01806 filed Sep. 12, 1995.

FIELD OF THE INVENTION

This invention relates to convert the characteristic of sounds such as voices, musical tones, natural sounds, and so on, and more specifically to facilitate the conversion operation, and also to sound-label association suitable for the characteristic conversion.

BACKGROUND ART

Converting the characteristic of sounds such as voices and obtaining intended characteristic has been in practice. Conversion of the characteristic is generally carried out by changing the time domain waveform and the frequency spectrum of the sound. For example, an operation is carried out in which analog sound signals are taken in, converted to digital sound data, the waveform is changed to correspond to an intended conversion of characteristic of the digital sound data, and again converted to analog sound data. Thus, the characteristic of the speech utterance is changed as intended.

However, the conventional method of converting the characteristic described above has the following problems. The operation of changing the characteristic is carried out by first displaying the time domain waveform of the sound, frequency spectrum, and parameters of linear predictive coding (LPC), and then manipulating them. A problem is that, in order to obtain the intended characteristic by that manipulation, one has to possess expertise of the time domain waveform, frequency spectrum, and parameters of the linear predictive coding. Another problem is that one has to be well trained for the intended conversion of the characteristic in addition to the expertise.

DISCLOSURE OF THE INVENTION

The object of the invention is to provide device and method of sound quality conversion, and device and method of sound-label association suited therefor, and capable of solving the problems described above through a simple operation.

The sound characteristic conversion device of one embodiment of the invention includes sound-label data holding means for holding sound data divided according to specified divisions and label data each associated with each of the divisions of the sound data. It further includes display control means for visually modifying the labels based on the label data according to modification data when the modification data are given to the label data. The display control means also causes display means to display the modified labels. This embodiment also includes conversion means for applying characteristic conversion corresponding to the modification data to the sound data associated with the label data according to the modification data given as corresponding to the label data.

The sound characteristic conversion device of one embodiment of the invention includes sound data dividing means for dividing inputted sound data according to sound divisions. It also includes label data dividing means for dividing inputted label data, to which division marks corresponding to said sound divisions are attached, according to the division marks. This embodiment further includes association forming means for associating the divided sound data with the divided label data.

The sound characteristic conversion device of one embodiment of the invention is characterized in that the visual modification to the labels is character modification to the labels.

The sound characteristic conversion device of one embodiment of the invention is characterized in that the visual modification to the labels is the order of the labels.

The sound characteristic conversion method of one embodiment of the invention is characterized by several steps. One step is that of associating label data in advance with sound data, and as well as, associating the contents of sound characteristic conversion in advance with modification process. Another step is that of visually modifying the labels represented with the label data according to given modification process and displaying the modified labels. Yet another step is that of applying characteristic conversion corresponding to the modification process given to the label data, to the sound data associated with the label data.

The sound characteristic conversion method of one embodiment of the invention is characterized by the several steps. These steps include dividing the inputted sound data according to said sound divisions, dividing the label data according to the sound divisions, and associating the divided label data with the divided sound data.

The sound characteristic conversion device of one embodiment of the invention includes sound-label data holding means for holding sound data divided according to specified divisions and label data each associated with each of the divisions of the sound data. This embodiment also includes conversion means for applying characteristic conversion corresponding to modification data to the sound data associated with the label data according to the modification data given as corresponding to the label data.

The sound characteristic conversion method of one embodiment of the invention is characterized by the several steps. These steps comprise associating label data in advance with the sound data, as well as associating the contents of characteristic conversion in advance with modification process, and applying characteristic conversion corresponding to the modification process given to the label data to the sound data associated with the label data.

The sound data transmission system of one embodiment of the invention is provided with a signal sending side device and a signal receiving side device and is capable to communicate through a communication passage for transmitting sound data from the signal sending side device to the signal receiving side device.

The signal sending side device of this embodiment of the invention comprises data inputting means for inputting label data and modification data and communication means for transmitting the label data and the modification data through the communication passage.

The signal receiving side device of this embodiment of the invention includes communication means for receiving the label data and the modification data from the signal sending side device. It also includes standard sound generation means for generating standard sound data according to the label data, and conversion means for converting sound characteristic of the standard sound data according to the modification data and generating sound characteristic conversion data.

One method according to an embodiment of the invention is for transmitting sound data from a sending side to a receiving side through a communication passage. In this method, on the sending side, label data and modification data are inputted. The label data and the modification data are transmitted to the receiving side through the communication passage. On the receiving side, the label data and the modification data are received from the sending side. Standard sound data are generated according to the label data, and sound characteristic of the standard sound data is converted according to the modification data to generate data of converted sound characteristic.

A sound-label associating device according to one embodiment of the invention includes sound data inputting means for inputting sound data and sound data dividing means for dividing sound data according to amplitude of sound pressure represented with the sound data. The device also includes label data inputting means for inputting the label data to which division marks are attached at positions corresponding to said divisions in the sound data. The device further includes label data dividing means for dividing the label data according to the division marks and association forming means for associating the divided sound data with the divided label data.

A sound-label associating device according to one embodiment of the invention includes sound data inputting means for inputting sound data and label data inputting means for inputting label data associated with sound data. The device also includes detailed association forming means for associating the sound data with respective labels and dividing them according to average duration of labels represented with the label data and duration of sound data.

A sound-label associating device according to one embodiment of the invention includes detailed association forming means for associating the sound data with respective labels and for dividing them according to average duration of labels represented with the label data and duration of sound data concerning the label data and the sound data associated with each other by means of the association forming means.

A sound-label associating device according to one embodiment of the invention includes a sound display area for visually displaying the acoustic feature represented with sound data and a label display area for displaying labels represented with label data, whereby division marks representing sound divisions are displayed in the sound display area.

A sound-label associating means according to one embodiment of the invention is characterized by several steps. These steps include dividing sound data according to the amplitude of the sound pressure represented with the sound data, receiving label data with division marks attached to positions corresponding to the divisions in the sound data, and dividing the received label data according to the division marks. The steps also include associating the divided sound data and the divided label data with each other.

A sound-label associating method according to one embodiment of the invention is characterized by several steps. These steps include preparing average durations for respective labels in advance and associating sound data with respective labels and dividing the sound data according to the average durations of respective labels represented with label data and the durations of the sound data.

A sound-label associating method according to one embodiment of the invention is characterized by several steps. These steps include preparing average durations for respective labels in advance and concerning the label data and the sound data associated with each other, associating sound data with respective labels and dividing the sound data according to the average durations of respective labels represented with label data and the durations of the sound data.

A displaying method for sound-label association according to one embodiment of the invention is characterized by several steps. These step include providing a sound displaying area for visually displaying the nature of sound represented with sound data and a label displaying area for displaying labels represented with label data and displaying the division marks indicating sound divisions in the sound displaying area.

In this invention, the term "label data" refers to sequences of characters, figures, symbols, pictures, and their combinations including, for example, icon data corresponding to text data and characters.

The term "sound data" refers to direct or indirect expressions of sound waveforms including, for example, digital data converted from analog waveforms of sounds, and data representing sounds by means of LPC parameters.

The term "modification" refers to operations including printing in boldface, addition of underlines and symbols, and interchanging orders. While the contents of the modification data may represent the contents of the characteristic conversion, when the label data are visually modified according to the modification data, in some cases it is preferable that the contents of the visual modification are represented.

The term "sound characteristic conversion" refers to causing certain changes in the acoustic features, or operations including, for example, changing pitches, changing intensity, adding vibrato, changing frequency spectrum, changing duration, changing sampling intervals, making voice quality feminine, making voice quality masculine, making sound intelligibility, making sound masking, and their combinations, and also interchanging order of sound output, and elimination of part of sound.

The sound characteristic conversion device of one embodiment of the invention and the sound characteristic conversion method of one embodiment of the invention are characterized in that label data are associated with sound data, and as well as requests of the sound characteristic conversion are associated with modification process, labels represented with the label data are visually modified according to given modification process and displayed, and the characteristic of the sound data associated with the label data is converted according to corresponding modification process given to the label data. Therefore, characteristic of sound may be easily converted.

The sound characteristic conversion device of one embodiment of the invention and the sound characteristic conversion method of one embodiment of the invention are adapted to divide the inputted sound data according to the sound divisions, divide the label data according to the sound divisions, and associate the divided label data with the divided sound data. Therefore, the sound data and the label data are associated with each other by simply inputting them.

The sound characteristic conversion device of one embodiment of the invention and the sound characteristic conversion method of one embodiment of the invention are characterized in that label data are associated with sound data, and as well as requests of the sound characteristic conversion are associated with modification process, the characteristic of the sound data associated with the label data is converted according to corresponding modification process applied to the label data. Therefore, sound characteristic may be converted simply by applying modification process to the label data having distinguishable sound divisions in comparison with the sound data.

The sound transmission device of one embodiment of the invention and the sound transmission method of one embodiment of the invention are adapted to input label data and modification data on the sending side, produce standard sound data according to the label data on the receiving side, convert the characteristic of the standard sound according to modification data, and generate data of converted sound quality. Therefore, sound having intended sound quality may be sent simply by sending the label data and the modification data.

The sound-label association device of one embodiment of the invention and the sound-label association method of one embodiment of the invention are characterized by dividing sound data according to the amplitude of sound pressure represented with the sound data, receiving label data attached with division marks at positions corresponding to the sound data division, dividing the label data according to the division marks, and associating the divided sound data with the divided label data. Therefore, the divided sound data may be easily associated with the divided label data.

The sound-label association device of one embodiment of the invention and the sound-label association method of one embodiment of the invention are for associating sound data with label data and characterized by preparing average duration for each label in advance, and associating sound data with respective labels and divided according to the average duration of each label and the duration of the sound data represented with the label data. Therefore, sound data are easily associated with respective labels.

The sound-label association device of one embodiment of the invention and the displaying method for sound-label association of one embodiment of the invention are characterized by comprising a sound display area for visually displaying the acoustic features represented with sound data, and a label display area for displaying labels represented with label data, wherein division marks representing sound divisions are displayed in the sound display area. Therefore, the label data may be inputted and displayed while confirming the sound data dividing positions.

BRIEF DESCRIPTION OF THE DRAWINGS

FIG. 6 shows label data stored in association with sound data.

FIG. 7 shows a state of the stored sound data.

FIG. 8 shows a label displayed on a CRT 16.

FIG. 9 shows correspondence between visual modification and contents of sound quality conversion.

FIG. 22 shows sample data transmitted in the embodiment shown in FIG. 21.

FIG. 23 shows a table in which modification data are represented with symbols.

PREFERRED EMBODIMENT OF THE INVENTION

Figure 2:
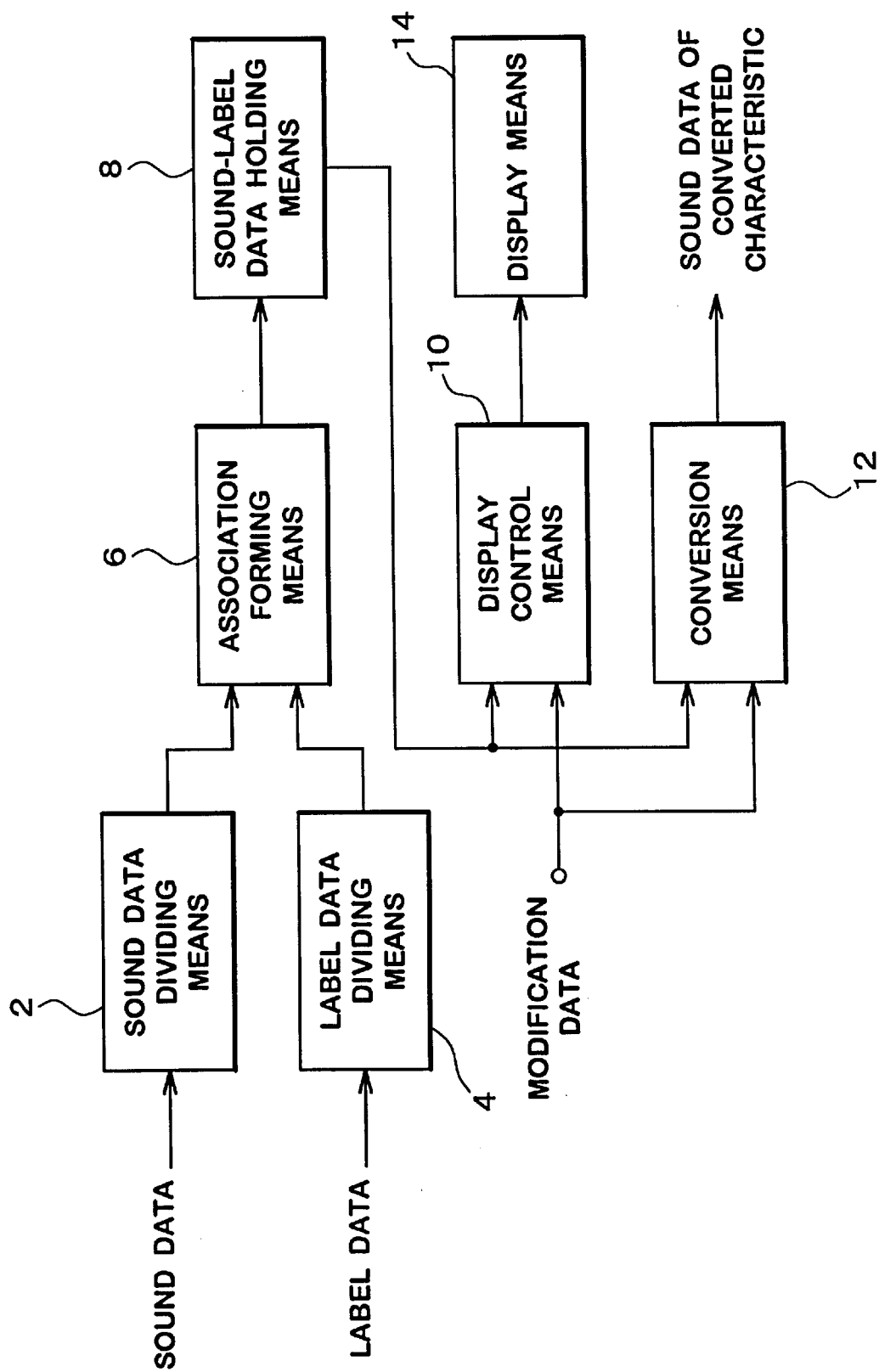
FIG. 2 shows an overall structure of the sound characteristic conversion device as an embodiment of the invention.

FIG. 2 shows an overall structure of the sound characteristic conversion device as an embodiment of the invention. A sound data dividing means 2 divides inputted sound data according to sound punctuation. Label data attached with punctuation marks corresponding to the sound punctuation are inputted to a label data dividing means 4. The label data dividing means 4 divides the label data according to the punctuation marks. The divided sound data and the divided label data are inputted to association forming means 6 and associated with each other in each division. The sound data and label data associated with each other are held in a sound and label holding means 8.

Display control means 10 receives modification data each corresponding to each division, modifies corresponding label data, and displays the modified label on the display means 14. This makes it easy to confirm which modification has been made to which division. Conversion means 12 receives modification data for each division, modifies corresponding sound data, and outputs the modified sound data.

Figure 3:
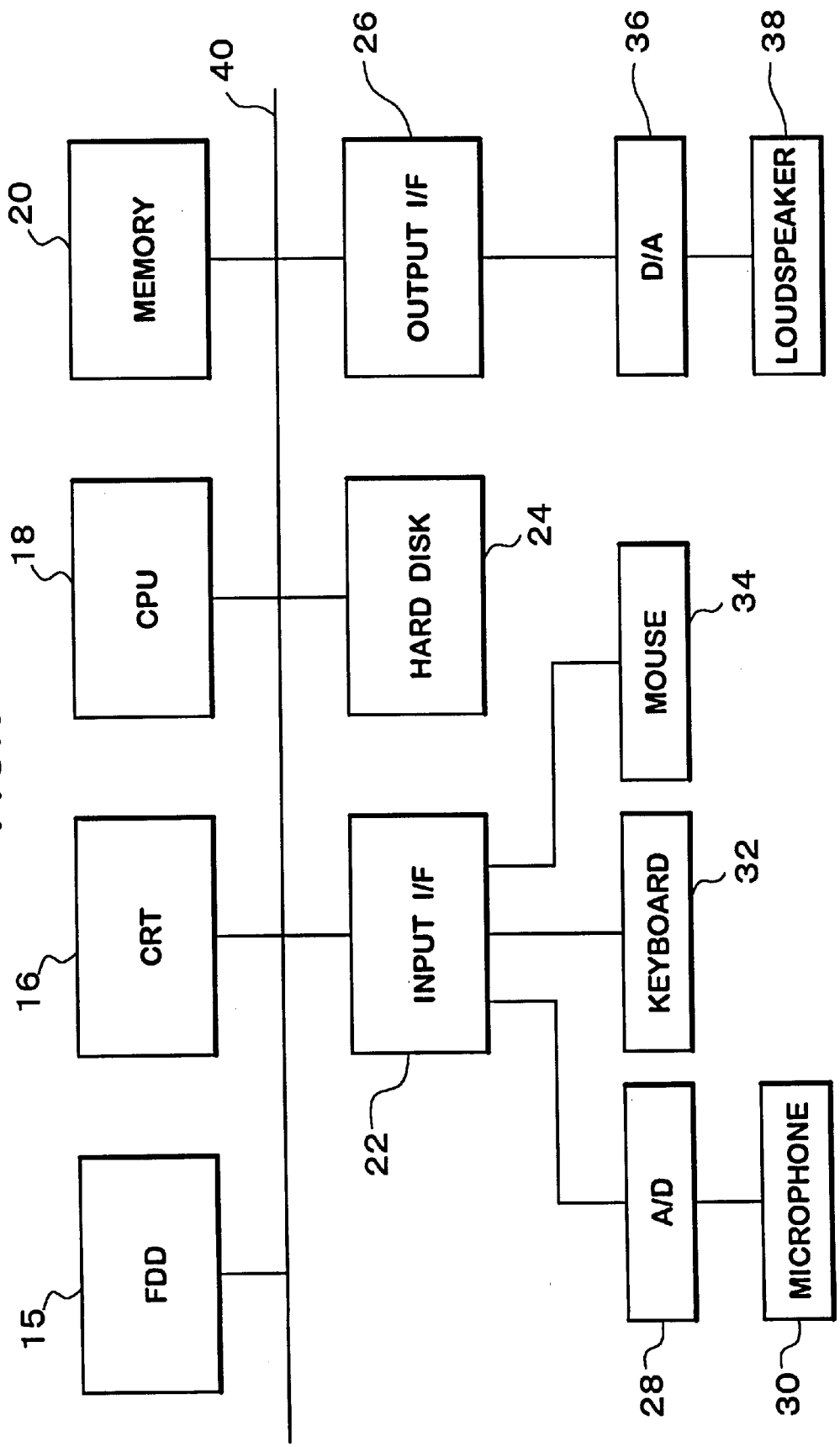
FIG. 3 shows a hardware structure using a CPU for providing the function shown in FIG. 2.
Figure 4:
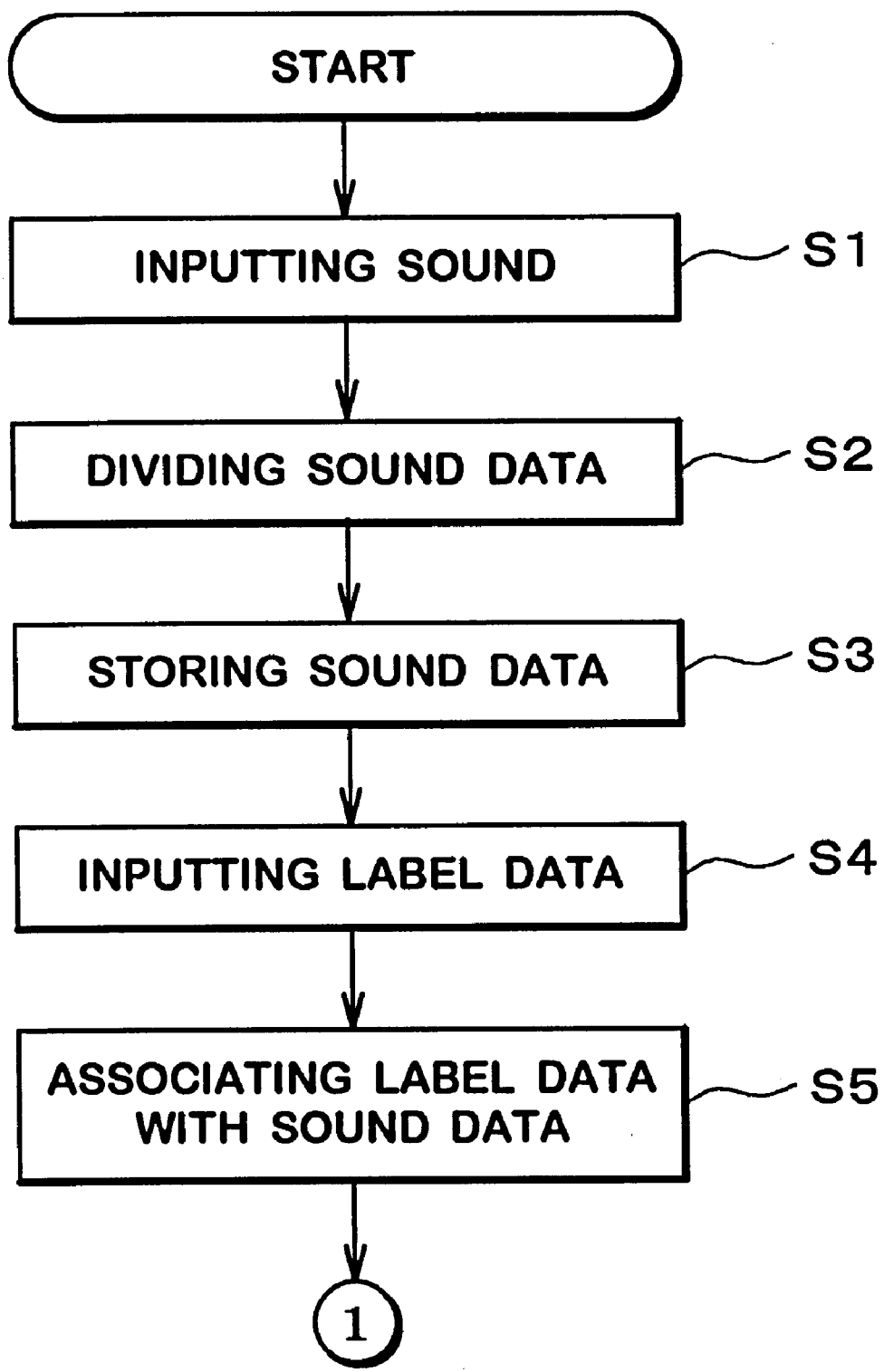
FIG. 4 is a flow chart showing the operation of the sound characteristic conversion device.
Figure 5:
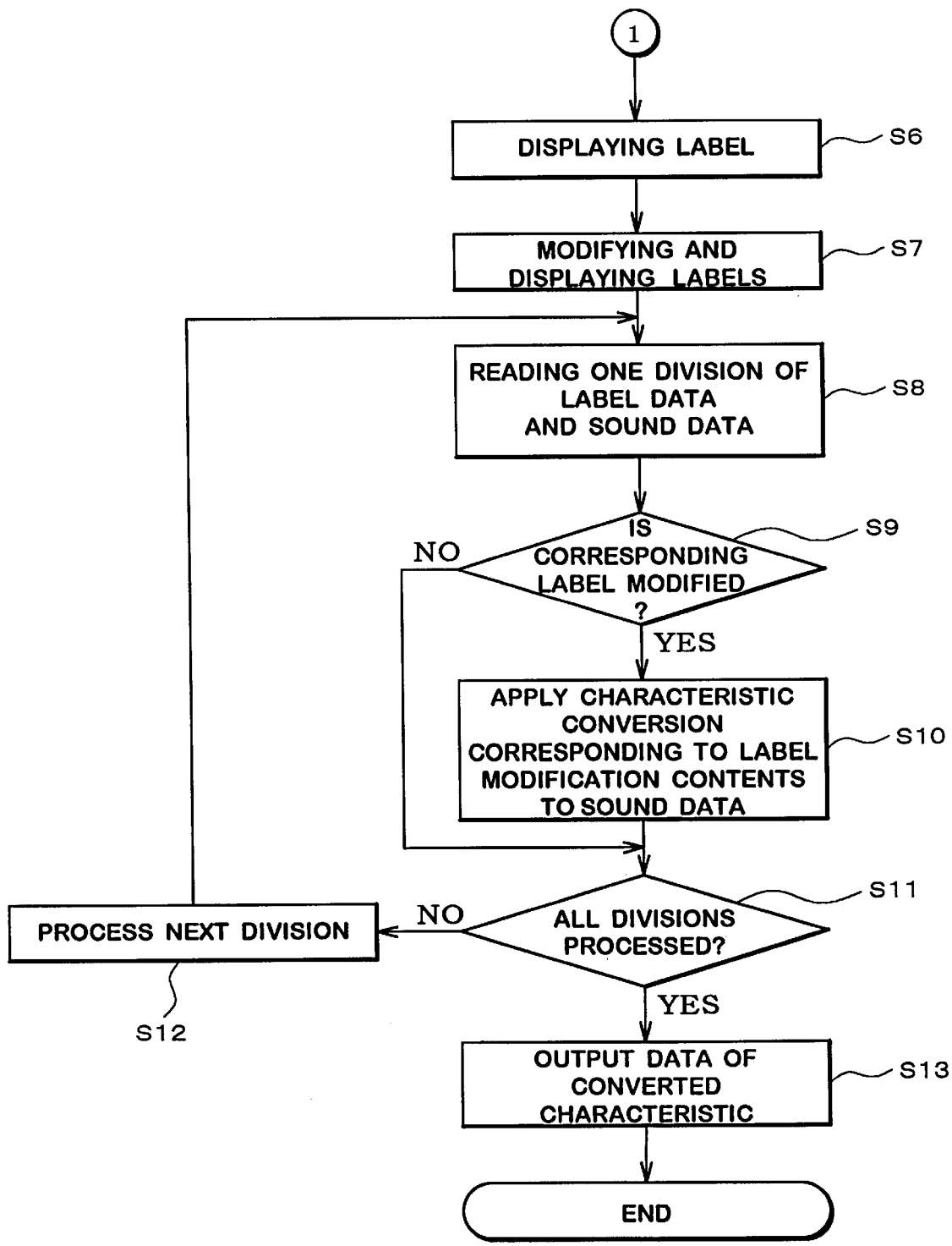
FIG. 5 is a flow chart showing the operation of the sound characteristic conversion device.

FIG. 3 shows a hardware structure according to FIG. 2 using a CPU. To a bus line 40 are connected; a CRT 16 as display means, a CPU 18, a memory 20 as sound-label data holding means, an input interface 22, a hard disk 24, an output interface 26, and a floppy disk drive (FDD) 15. A microphone 30 is connected through an A/D converter 28 to the input interface 22. A keyboard 32 and a mouse 34 are connected also to the input interface 22. A speaker 38 is connected through a D/A converter 36 to the output interface 26. A program with its flow charts shown in FIGS. 4 and 5 is stored in the hard disk 24. The program is installed using the FDD 15 from a floppy disk (recording medium) to the hard disk 24. As a matter of course, it may be installed from other recording medium such as a CD-ROM. The memory 20 is used both as sound-label data holding means and as a work area for running the program.

Figure 1:
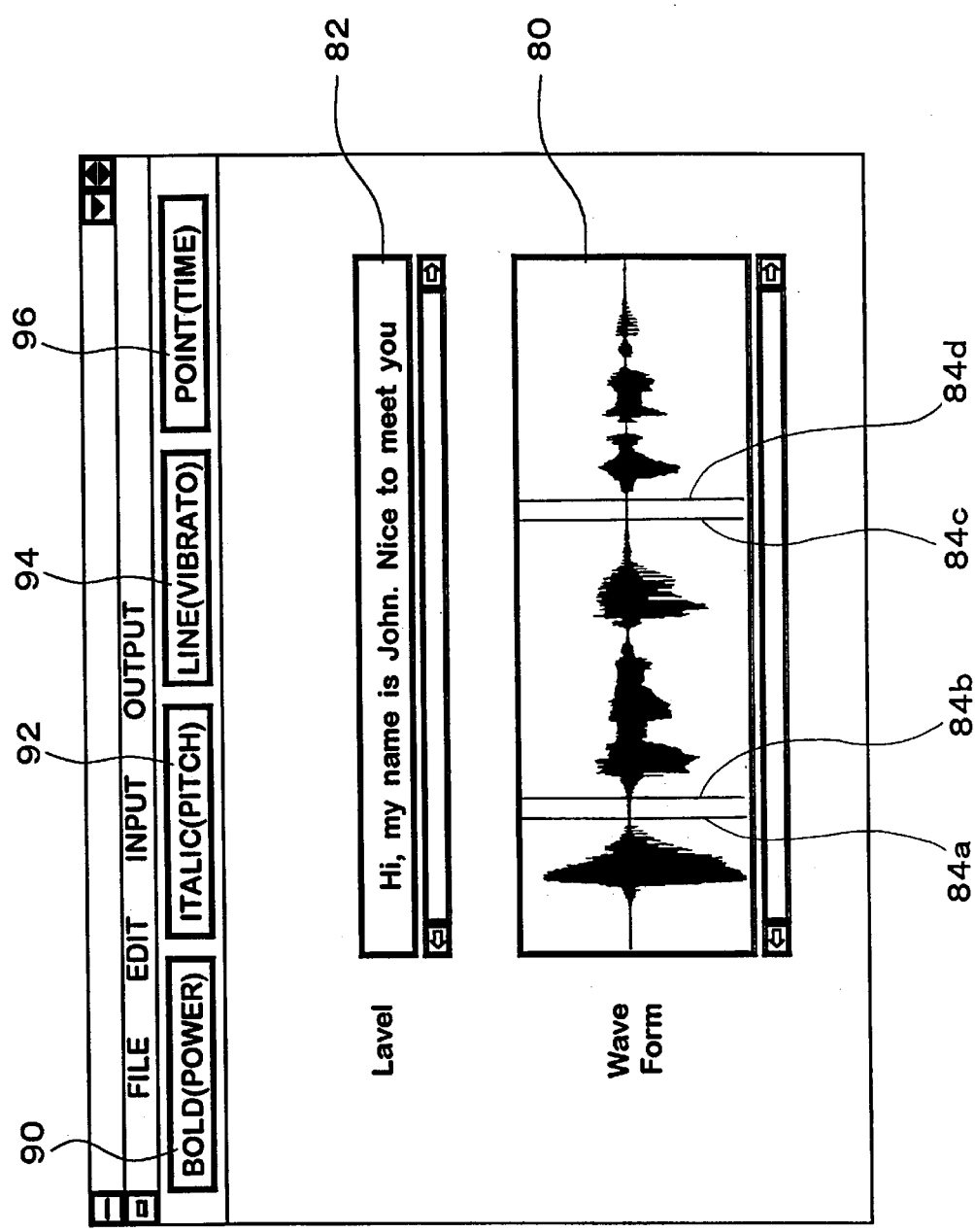
FIG. 1 shows a display screen of a sound characteristic conversion device as an embodiment of the invention.

The process function of the CPU 18 will be described in reference to FIGS. 4 and 5. First in the step S1, a sound signal (analog sound data) is inputted through the microphone 30. When the sound signal is inputted to the CPU 18, it takes in digital data (digital sound data) converted with the A/D converter 28. Then the CPU 18 displays the waveform of the sound data on a sound display area 80 of the CRT 16. The displayed state is shown in FIG. 1.

Figure 12:
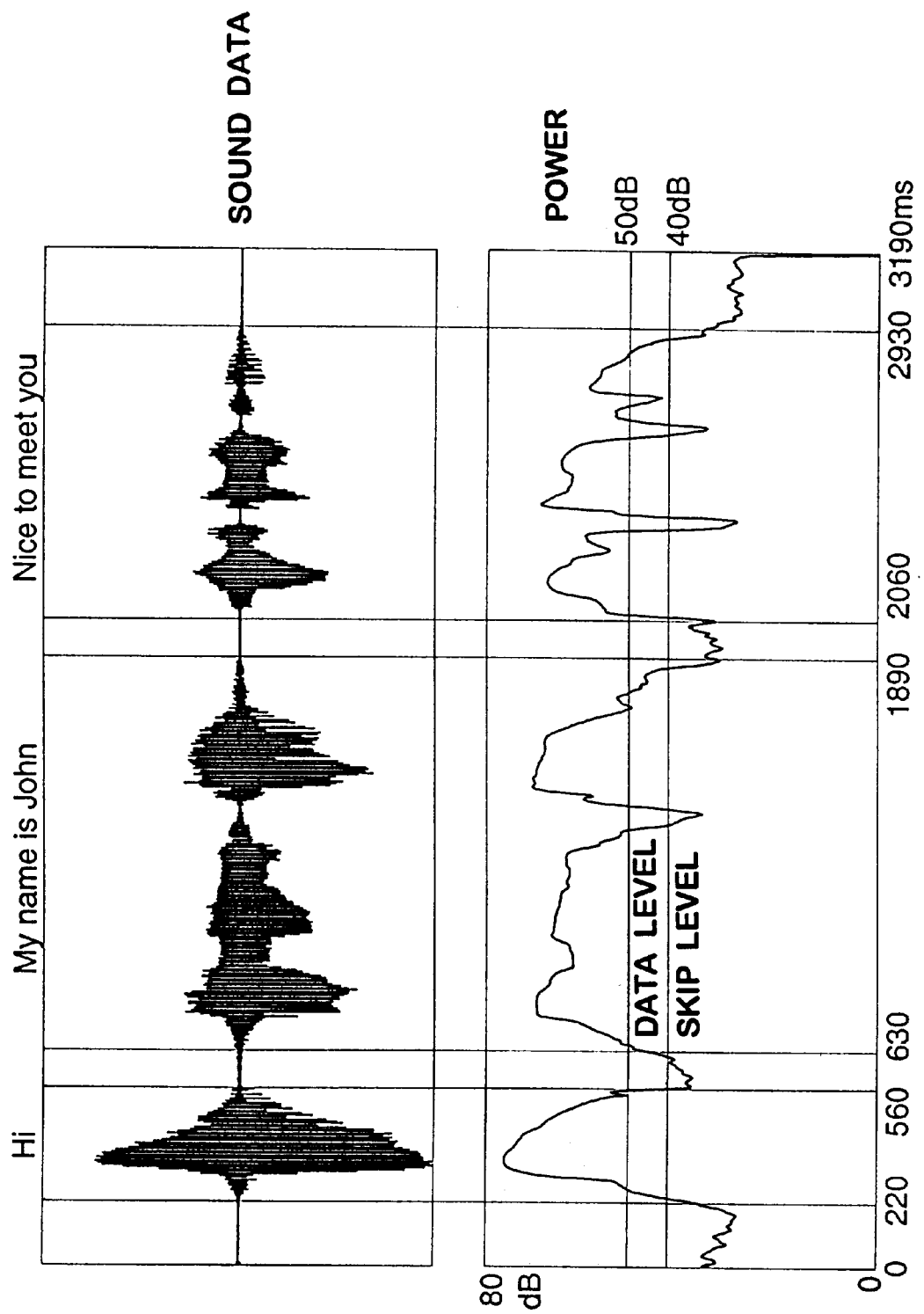
FIG. 12 is for describing sound data division.

Next, the digital sound data is divided according to sound punctuation (step S2). The division is made as follows: For example, it is assumed that a speech utterance input is made as "Hi my name is John Nice to meet you". The digital sound data obtained here is assumed as shown in the upper area of FIG. 12. The upper area of FIG. 12 shows the digital sound data in the waveform. The CPU 18 calculates an average power over the short period of time of the digital sound data. The calculated short time period average power is shown in the lower area of FIG. 12.

Next, the CPU 18 divides the data according to two threshold values of data level and skip level. After finishing the dividing operation, when the short period average power exceeds the data level continuously for 100 ms or longer, then a new dividing operation is started. After starting the operation, when the short period average power is below the skip level continuously for 80 ms or longer, it is determined that the dividing operation is over. In this way, the dividing operation is carried out. By the way, in this embodiment, the data level is assumed to be 50 dB and the skip level 40 dB.

According to the division described above, it is determined as shown in FIG. 12 that the first zone is 220 ms–560 ms, the second zone is 630 ms–1890 ms, and the third zone is 2060 ms–2390 ms. The CPU 18 displays dividing position lines 84a, 84b, 84c, and 84d in the waveform shown in the sound display area 80 of the CRT 16 (Refer to FIG. 1.)

Also, the CPU 18 stores the divided digital sound data in the memory 20 (step S3). Each of the sound data stored in the memory 20 are shown in FIG. 7. The first zone data is stored at an address ADRS1, the second zone data at an address ADRS2, and the third zone data at an address ADRS3.

Next, a label data corresponding to the sound data mentioned above is inputted from the keyboard 32 to a label display area 82 of the CRT 16 shown in FIG. 1 (step S4). Here, punctuation marks as division marks are inputted to the same positions as those of divisions of the sound. For example, concerning the sound data mentioned above, an input is made as "Hi, my name is John. Nice to meet you." The CPU 18, upon receiving this input, divides the label data into three parts; "Hi," "my name is John." and "Nice to meet you."

As shown in FIG. 1, this embodiment is adapted to display the dividing position lines 84a, 84b, and 84c on the sound data. Therefore, it is easy to input division marks corresponding to the label data before the data are inputted.

The CPU 18 associates the divided label data sequentially with the divided sound data and stores them (step S5). That is to say, as shown in FIG. 6, the head address of each of the sound data corresponding to the label data is stored together with the label data.

Here, when the number of divisions of the sound data is not the same as that of the label data, it is preferable to change the number of divisions of the sound data according to that of the label data. That is to say, both numbers of divisions may be made identical by changing the threshold values of the sound data division (the data level and skip level) and dividing again the sound data. Alternatively, both numbers of divisions may be made identical by increasing or reducing the number of dividing positions by estimating from the number of characters of the label data whether the number should be increased or reduced. Also, the operator may change the division by the use of the mouse 30 or the keyboard 32.

Next, the CPU 18 displays the label corresponding to the inputted label data on the display area 82 of the CRT 16 (shown in FIG. 1) (step S6). The displayed label is shown in FIG. 8. Next, the operator applies a visual modification, which has been predetermined according to the contents of conversion of each sound characteristic, to the displayed label. An example of correlation between visual modification and sound characteristic conversion is shown in FIG. 9. Once this correspondence table is stored and hel, the correlation between visual modification and sound characteristic conversion is exchanged by changing the contents of the table. By the way, since the contents of FIG. 8 are displayed as icons on the CRT 16 as shown in FIG. 1, they serve as guidance to facilitate operation.

When one wants to raise the power for the part "my name is John" only, one can make the following operation. First, the part "my name is John" in the label display area 82 of FIG. 1 is selected by using the keyboard 32 or the mouse 34. Next, an icon 90 for modifying the selected part "my name is John" into boldface is clicked with the mouse 34. As a result, a modification data "\BOLD" is added to the part "my name is John" in the memory 20. Here, the symbol "\" denotes that the succeeding character sequence is a control code (modification data).

Figures 10, 11:
FIG. 10 shows label data to which modification data are applied.
FIG. 11 shows a label to which visual modification is applied.

In the step S7, the CPU 18 displays the label modified according to the modification data in the label display area 82 of the CRT 16 (Refer to FIG. 11). As is clearly seen from FIG. 11, the positions where characteristic conversion is applied and its requests are easily confirmed.

Next, the CPU 18 reads the first division of the label data shown in FIG. 10, and reads corresponding sound data according to the head address ADRS1 (step S8). Thus, the digital sound data of the "Hi" part shown in FIG. 12 is loaded. Next, whether a modification data is added to the label data is determined (step S9). Since no modification data is added here, the process goes to the next step S11.

In the step S11, the CPU 18 determines whether all the divisions have been processed. If no, the steps from S8 on are repeated in the next step (S12). To the next division "my name is John" is added a modification data "\BOLD." Therefore, the process goes from the step S9 to the step S10.

In the step S10, a characteristic conversion predetermined for "\BOLD" is applied to the digital sound data of "my name is John." Here, power of the sound data is increased according to the table shown in FIG. 9. Power is increased by increasing the amplitude of the waveform represented by the digital sound data. The sound data with its characteristic changed as described above is stored again at the address ADRS2 shown in FIG. 7 (It may be stored at other address to retain the original sound data).

Figure 15A:
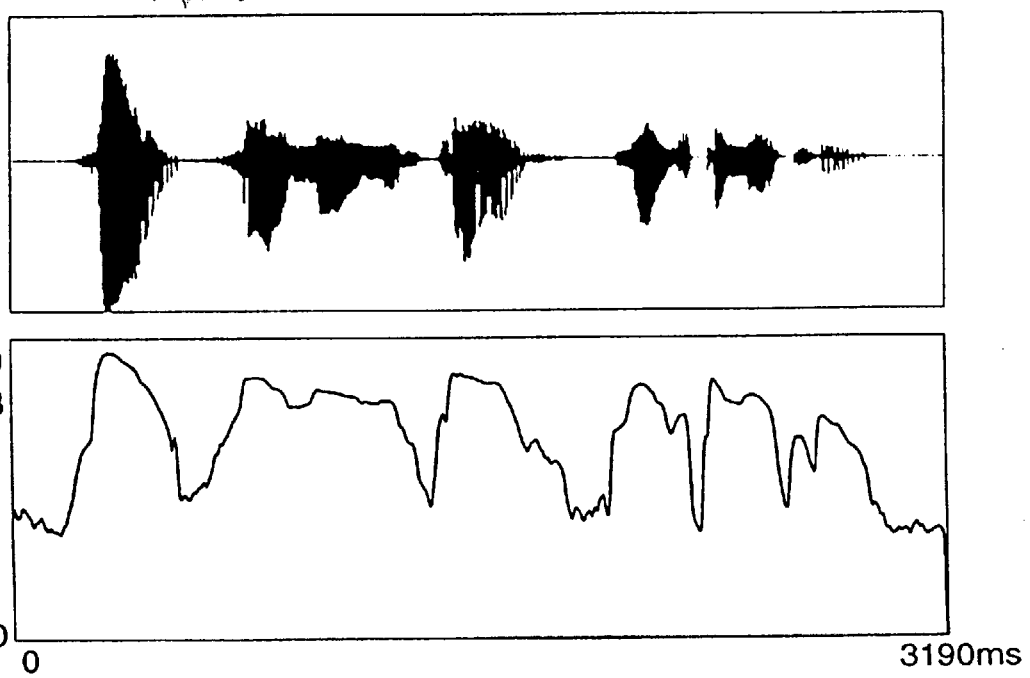
FIG. 15A shows sound data before the power is changed and average power for the short period of time.
Figure 15B:
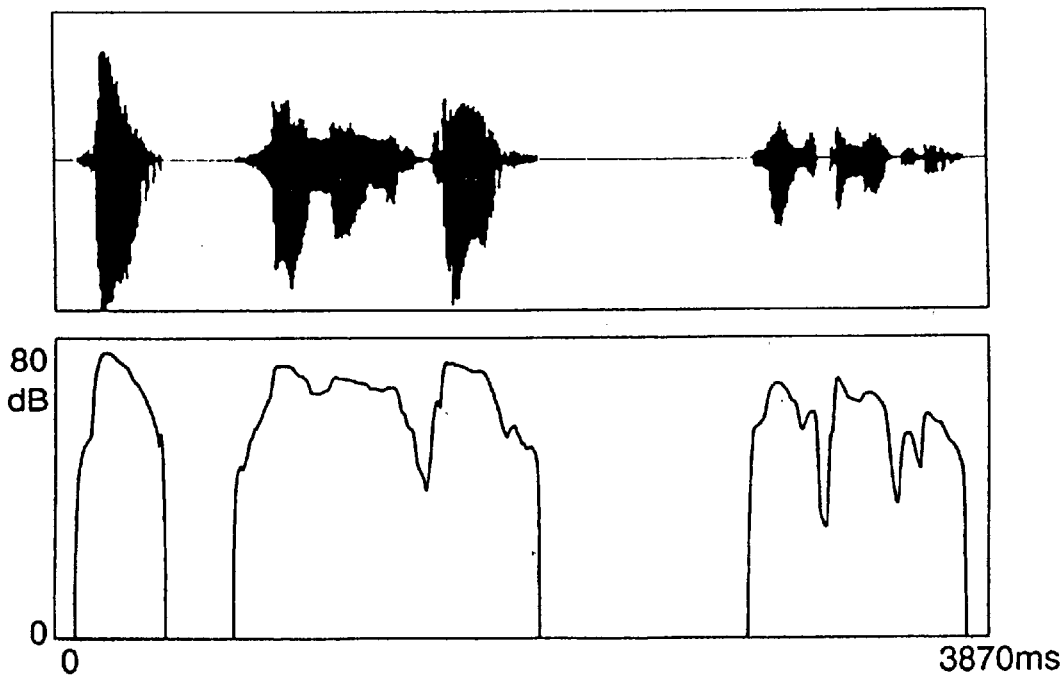
FIG. 15B shows sound data after the power is changed and average power for the short duration.

After processing all the divisions, the CPU 18 outputs the digital sound data to which the sound quality conversion has been applied from an interface 26 (step S13). FIGS. 15A and 15B show the sound data before and after the characteristic conversion, respectively. It is seen that conversion is made that power of the part "my name is John" is increased. The digital sound data converted in this way are converted to analog sound data with the D/A converter 36 and outputted from the speaker 38 as a sound having converted characteristic. That is to say, the part "my name is John" is made louder and outputted.

As described above, the sound quality is converted with very simple operation of only applying the visual modification to the labels. Furthermore, what kind of sound quality conversion is applied to which division is easily confirmed.

Also, pitch can be increased in a similar manner. In that case, an area where an increase in pitch is intended should be selected and then the icon 92 should be selected (Refer to FIG. 1).

Figure 13:
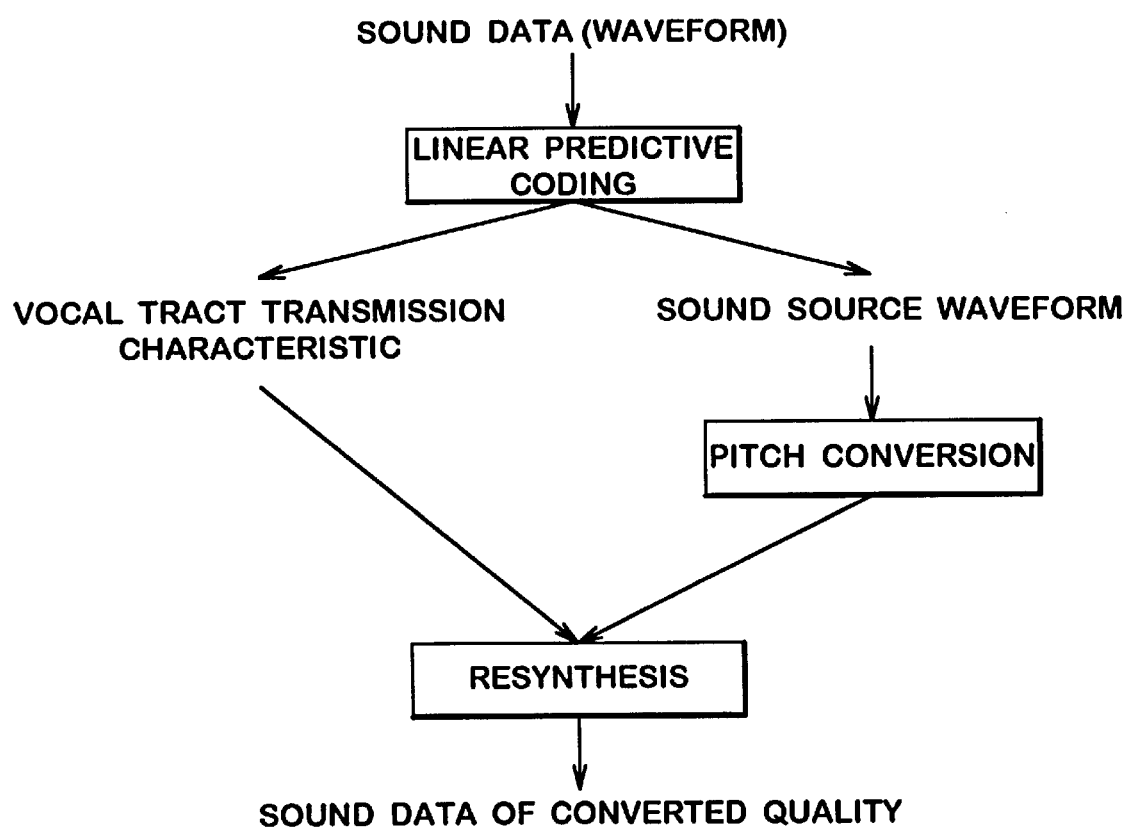
FIG. 13 shows a pitch conversion process.
Figure 14A:
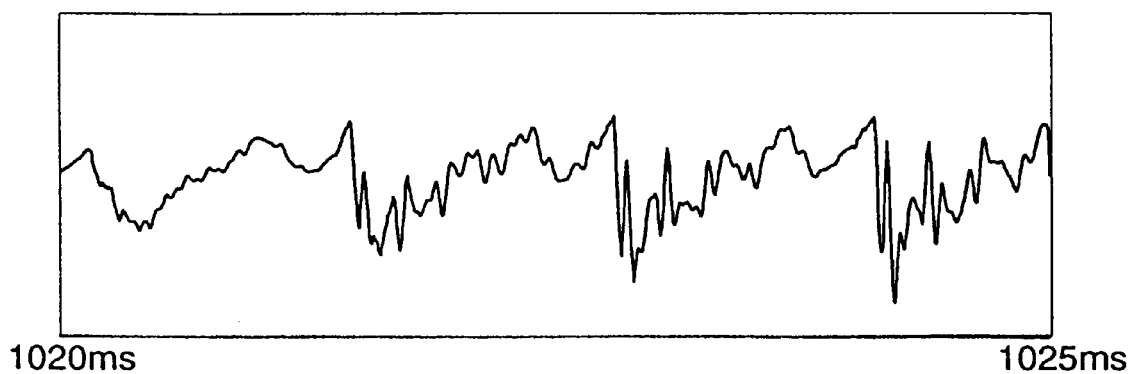
FIG. 14A shows a sound source waveform before pitch conversion.
Figure 14B:
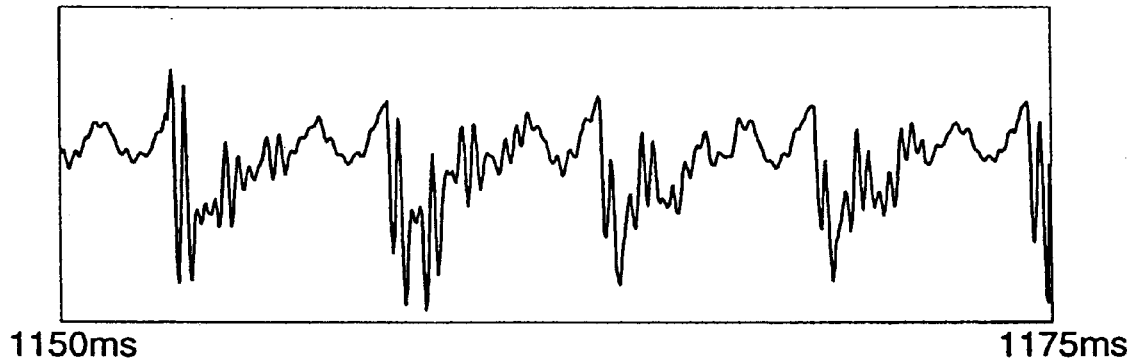
FIG. 14B shows a sound source waveform after pitch conversion.

The process of increase in pitch is shown in FIG. 13. First, the CPU 18 applies a linear predictive coding (LPC) to the subject digital sound data to separate the sound data into sound source data and vocal tract transmission characteristic data. Next, pitch of the separated sound source data is increased and the data are combined again with the vocal tract transmission data to obtain digital sound data with the increased pitch. By the way, detailed description is seen in: Markel, J. D. and A. H. Gray, Jr. Linear Prediction of Speech translated by Hisayoshi Suzuki, Corona Publishing. FIG. 14 shows part of the digital sound data both before and after the increase in pitch.

Figure 16A:
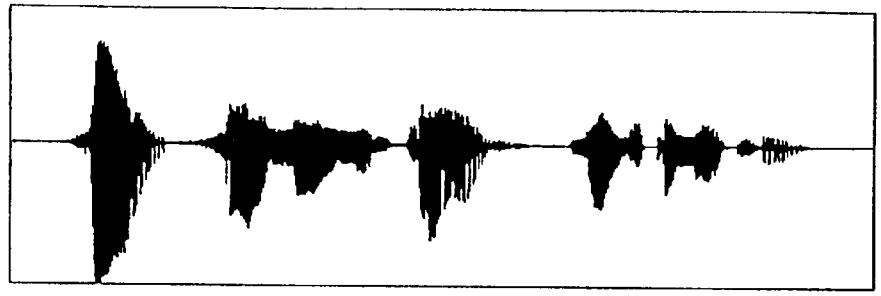
FIG. 16A shows original sound data.
Figure 16B:
FIG. 16B shows sound data with changed sound duration length.
Figure 16C:
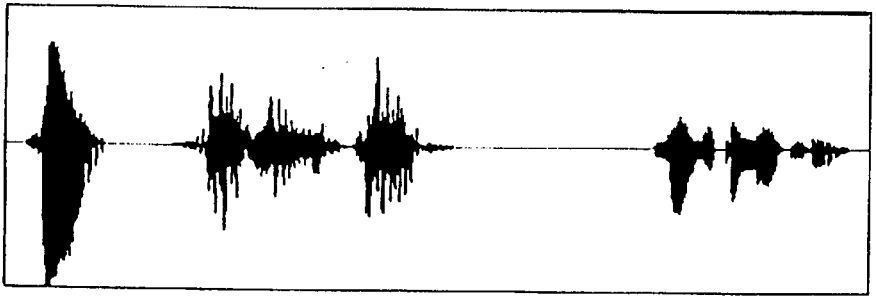
FIG. 16C shows sound data with vibrato.

Examples of converting other sound characteristic are shown in FIGS. 16A, 16B, and 16C. FIG. 16A shows the sound data before conversion. FIG. 16B shows the sound data with the duration for "my name is John" changed. The label size is processed to correspond to the duration.

FIG. 16C shows the sound data after applying vibrato to "my name is John." The label is underlined. Types of vibrato may be changed according to the types of underline.

While the above description does not include all the possible sound characteristic conversions, this invention is generally related to all the sound characteristic conversions. By the way, when the sound characteristic conversion is to be applied in the frequency domain, the process should be carried out with FFT and the like by obtaining frequency spectrum.

Figure 18:
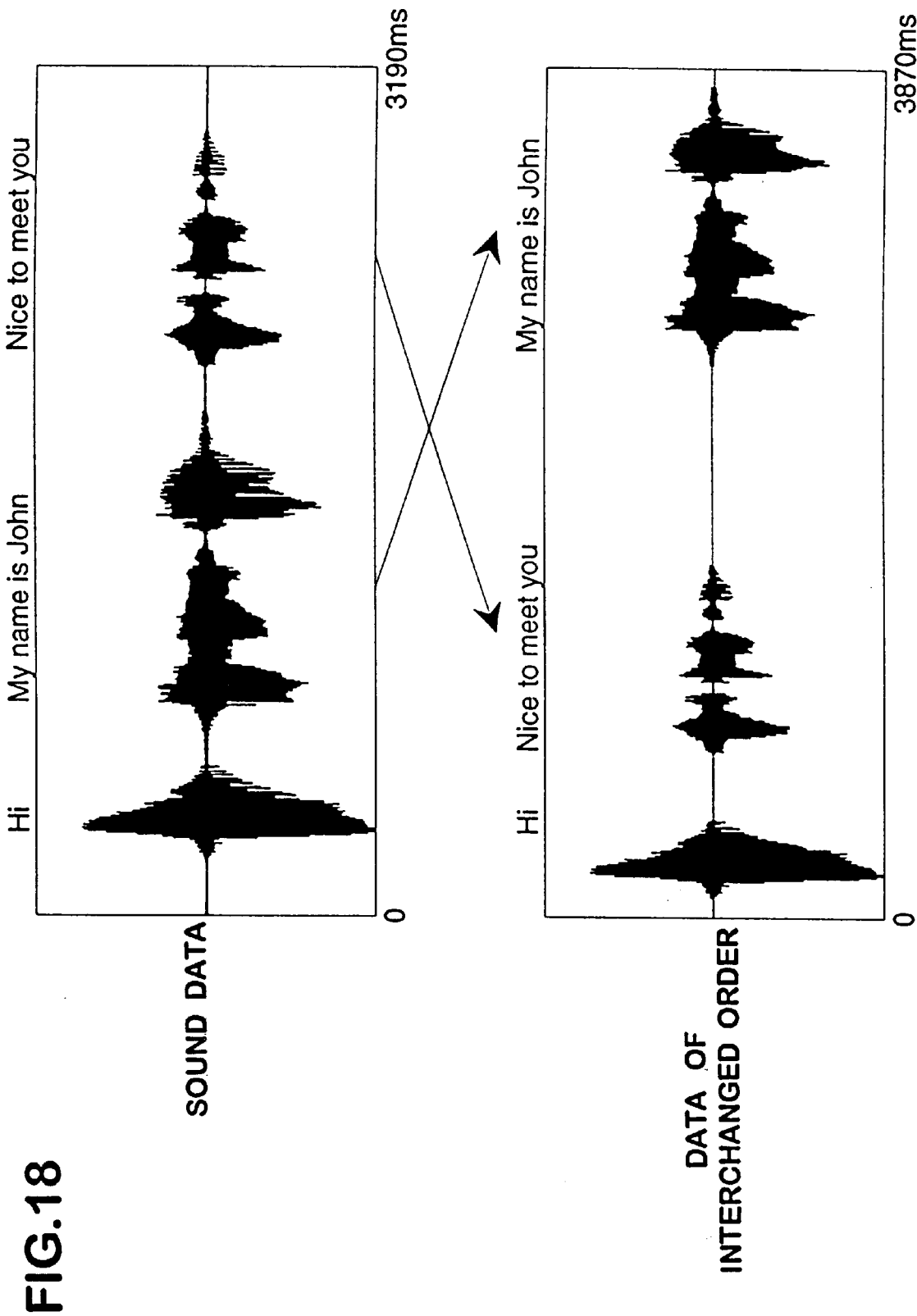
FIG. 18 shows interchange of sound order.

The sound characteristic conversion includes, in addition to the above case in which mainly the sound quality is changed, such processes as changing the order of sounds, eliminating part of the sounds, and repeating the sounds. For example as shown in FIG. 18, output order of sounds may be changed by interchanging the labels associated with the sounds. In this example, "Hi, my name is John. Nice to meet you." is changed to "Hi, Nice to meet you. My name is John." Likewise, a sound may be eliminated by eliminating a label, or a sound may be repeated by duplicating a label.

Figure 17A:
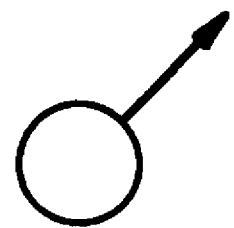
FIG. 17 shows example symbols for use as modifications to icons.
Figure 17B:
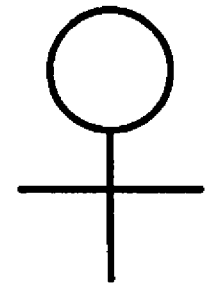

While the description of the above embodiment is made using the character sequence as an example of the label, symbols, marks, and icons may also be used. Also, the method of modification may be such that, when the voice is made masculine, a male symbol shown in FIG. 17A may be superimposed on the subject icon, and when the voice is made feminine, the female symbol shown in FIG. 17B may be superimposed on the subject icon.

Or, it may also be arranged to predetermine the contents of the sound quality conversion associated with portraits displayed on the screen, and to select the contents of the sound quality conversion by selecting a portrait with the mouse.

Furthermore, while the embodiment described above is related to the human voice, the invention may be applied to any kind of sound including the musical tone, and natural sound such as the sound of wind, and the sound of waves.

Furthermore, while the sound is inputted from the microphone 30 in the above embodiment, the sound may be synthesized according to the label data. In that case, a basic sound is synthesized according to the label data, and the characteristic of the synthesized sound is converted according to the contents of modification applied to the label data, and outputted. Alternatively, it may also be arranged that the sound is described as data using LPC parameter and the like and then given out.

Figure 19:
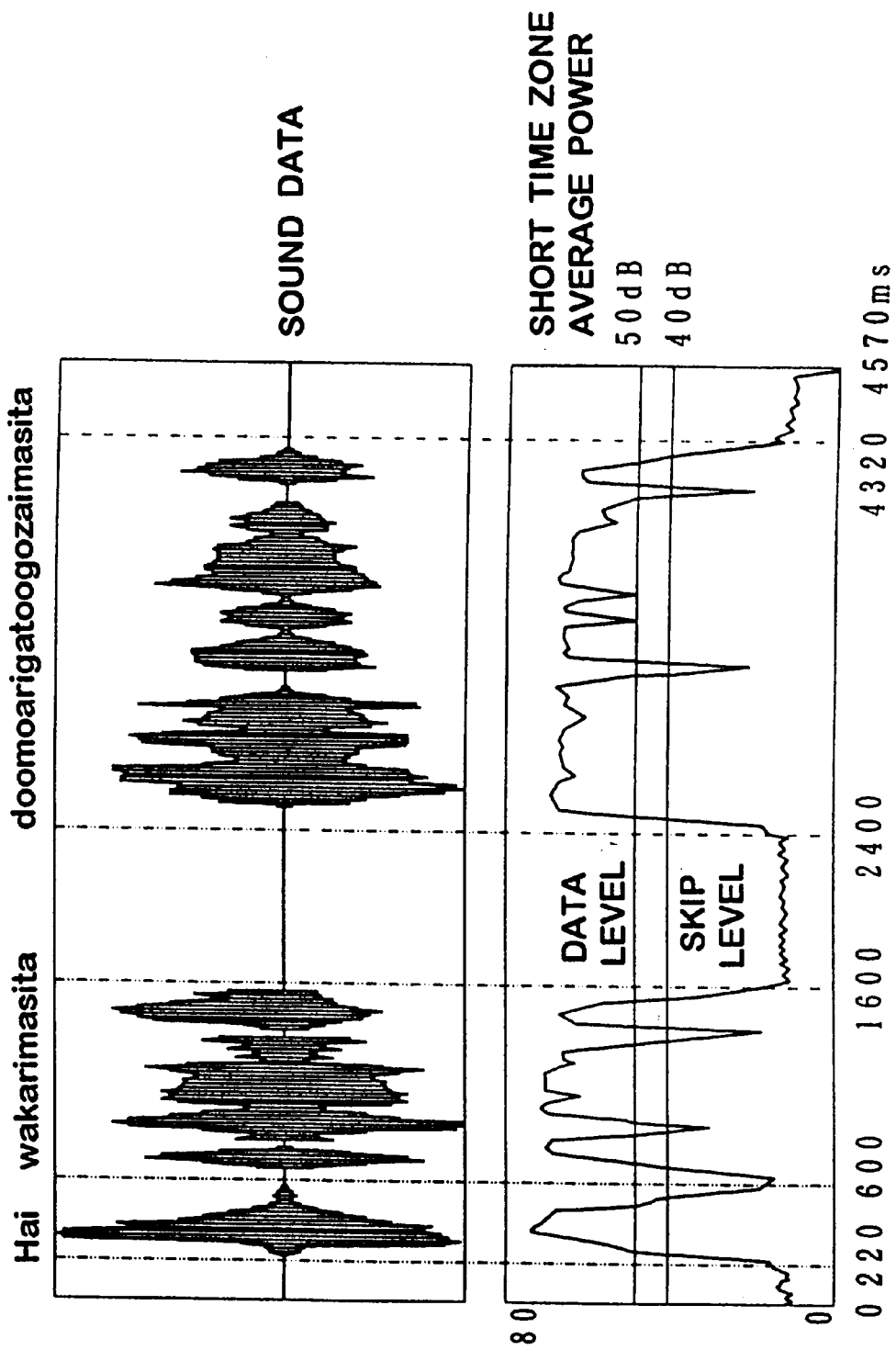
FIG. 19 shows an example of division process for Japanese language.

While the above embodiment is described in reference to the English voice, this invention is not limited to the English language but may be applied to any language. FIG. 19 shows a process state of division for a sound input of "Hai wakarimashita doumo arigatou gozaimashita" in Japanese.

In the above embodiment, the sound quality conversion is made by applying modification to each division. However, it is also possible to apply the sound quality conversion to each syllable if the speech data is divided at each syllable according to the number of label data in each division. Such a further fine division is described in reference to an example of a Japanese speech input "Tassura" (As a matter of course, it is applicable to any other language).

First, an average duration of each element is measured in advance when a plural number of talkers pronounce elements of the labels. The result is made as a table shown in Table 1 and stored in advance on a hard disk 24.

TABLE 1

| Category | Elements | Average duration time (Deviation) |
|---|---|---|
| CV | KA, KI, KU, KE, KO, SA, SI, SU, SE, SO, TA, TI, TU, TE, TO, NA, NI, NU, NE, NO, HA, HI, HU, HE, HQ, MA, MI, MU, ME, MO, YA, YU, YO, RA, RI, RU, RE, RO, WA, GA, GI, GU, GE, GO, ZA, ZI, ZU, ZE, ZO, DA, DI, DU, DE, DO, BA, BI, BU, BE, BO, PA, PI, PU, PE, PO, SHA, SHU, SHO, CHA, CHU, CHO, JA, JU, JO | 204.0 ms (40.0 ms) |
| CYV | KYA, KYU, KYO, NYA, NYU, NYO, HYA, HYU, HYO, MYA, MYU, MYQ, RYA, RYU RYO, GYA, GYU, GYO, BYA, BYU, BYO, PYA, PYU, PYO, | 169.3 ms (19.6 ms) |
| DV | KKA, KKI, KKU, KKE, KKO, SSA, SSI, SSU, SSE, SSO, TTA, TTI, TTU, TTE, TTO, HHA, HHI, HHU, HHE, HHO, YYA, YYU, YYO, RRA, RRI, RRU, RRE, RRO, WWA, GGA, GGI, GGU, GGE, GGO, ZZA, ZZI, ZZU, ZZE, ZZO, DDA, DDI, DDU, DDE, DDO, BBA, BBI, BBU, BBE, BBO, PA, PI, PU, PE, PO, SSHAA, SSHHU, SSHHO, CHAA, CHHU, CHHO, JJA, JJU, JJO | 381.0 ms (49.4 ms) |
| DYV | KKYA, KKYU, KKYO, HHYA, HHYU, HHYO, RRYA, RRYU, RRYO, GGYA, GGYU, GGYO, BBYA, BBYU, BBYO, PPYA, PPYU, PPYO | 356.3 (24.2 ms) |
| V | A, I, U, E, O | 143.8 ms (34.0 ms) |
| N | NN | 118.5 ms (29.4 ms) |

First, total duration T of the inputted sound data "Tassuru" is measured. Here, the measured total duration is assumed to be 802 ms. Next, elements of the label data "Tassuru" associated with the sound data are divided into categories according to Table 1. That is to say, the division is made into "ta," "ssu," and "ru" and it is determined that they respectively belong to categories CV, DV, and CV. The CPU 18 sums the average durations t1, t2, and t3 of the respective elements from the Table 1. Here, the total is 204.0 ms+381.0 ms+204.0 ms=789.0 ms. Next from the total duration t and the average durations t1, t2, and t3, duration ratios of respective elements r1, r2, and r3 are calculated. For example, the duration ratio of the element "ta" is 204.0/789.0. Similarly, the duration ratios r2 and r3 of the elements "ssu" and "ru" are 381.0/789.0 and 204.0/789.0, respectively.

According to the duration ratios r1, r2, and r3 of respective elements calculated as described above, the measured total duration T is allocated to respective elements. For example, the actual duration T1 allocated to the element "ta" is calculated as, $$T1=T\cdot r1$$

Actual durations T2 and T3 allocated to the elements "ssu" and "ru" are similarly calculated respectively as $$T2=T\cdot r2$$
$$T3=T\cdot r3$$

Figure 20:
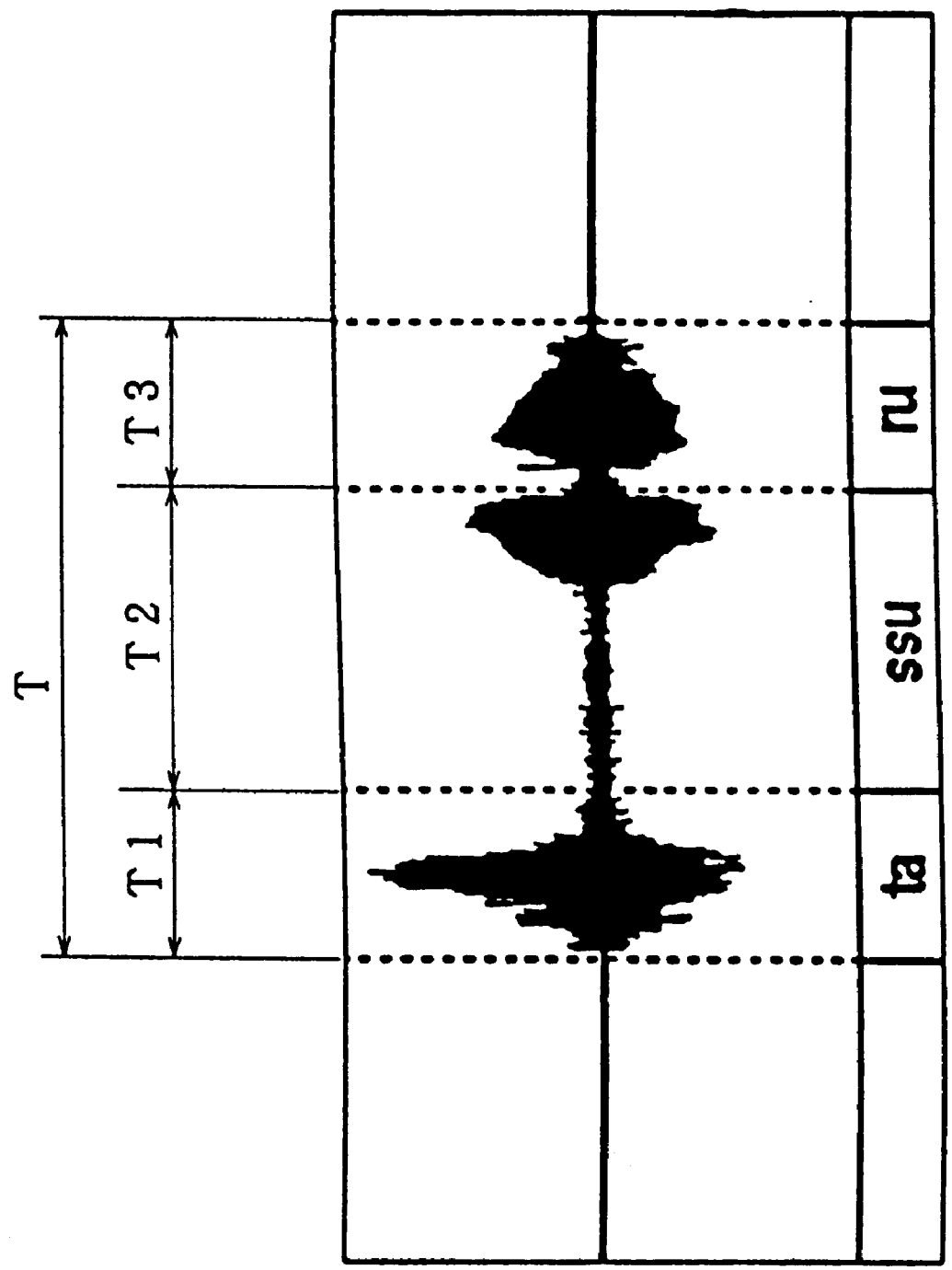
FIG. 20 shows an example of division for each label.

According to the actual durations T1, T2, and T3 calculated as described above, the sound data are divided as shown in FIG. 20. The process described above makes it possible to divide the sound data more in detail (by respective label elements) and to associated with labels (forming detailed association). Therefore, characteristic of sound may be converted for each of the label elements. For example, vibrato may be applied to the element "ru" only by modifying "ru" only with an underline.

In this way, the sound data may be easily divided into syllables. By the way, it may also be arranged to estimate syllables more accurately using a speech recognition technique.

The above embodiment is arranged that the display control means 10 and the display means 14 are provided to confirm the modification of the label data. However, if the structure of the modification data is known as shown in FIG. 10, it is possible to input the modification data without those means 10 and 14. In that case, although the modification cannot be confirmed with the display means 14, the following effects are provided.

Although the modification data may be attached to the sound data, since syllable divisions are not clear in the sound data, sound quality cannot be converted in specific syllable ranges. In contrast to this, the label data has clear divisions (corresponding to syllable divisions) among syllable characters, and therefore sound quality conversion may be easily applied to specific syllable ranges or syllables extending over intended ranges.

By the way, while a CPU is used in the above embodiment to provide the functions of respective blocks shown in FIG. 2, part or all of the functions may be given by using hardware logic.

Figure 21:
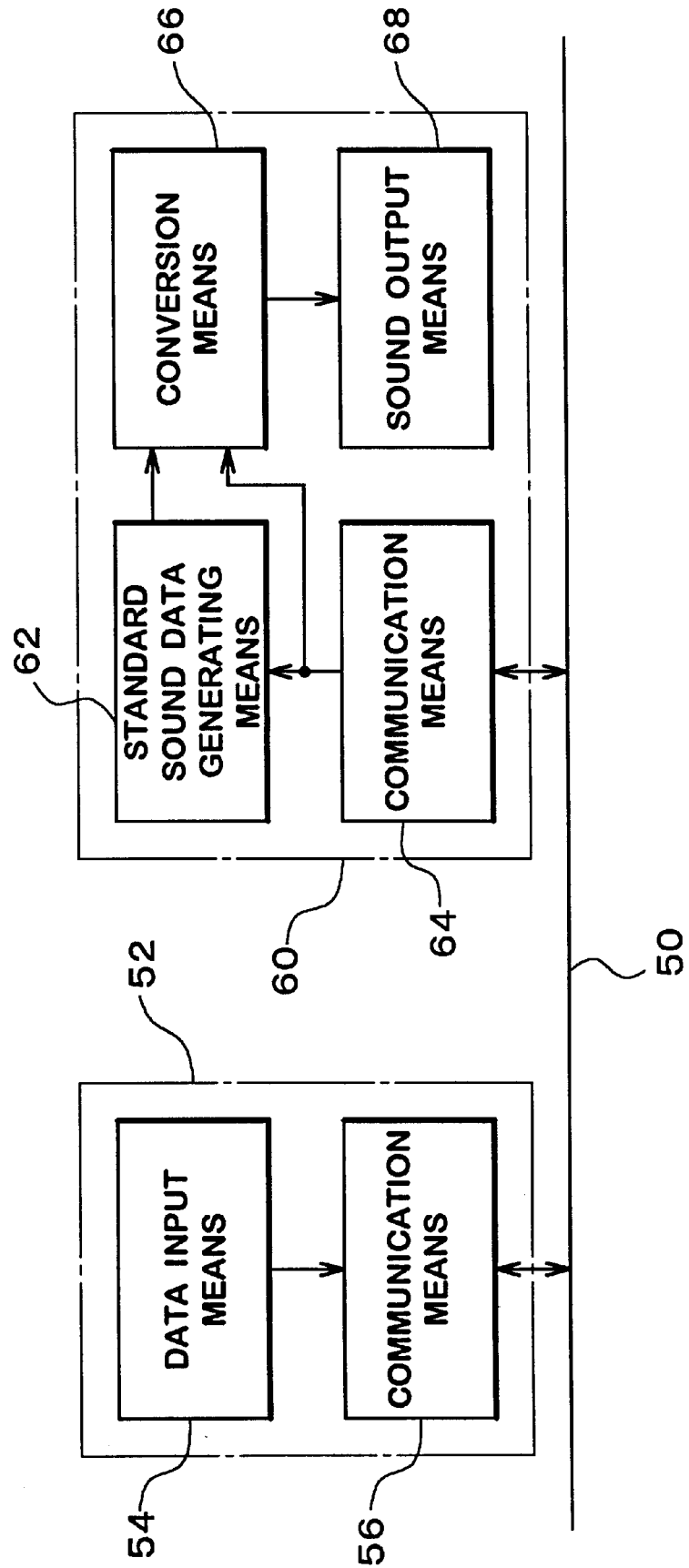
FIG. 21 shows an embodiment of a sound transmission device.

FIG. 21 shows an embodiment of a sound signal transmission system. A signal sending side device 52 and a signal receiving side device 60 are interconnected through a communication passage 50. The communication passage 50 may be either wired or wireless. The signal sending side device 52 is provided with data input means 54 such as keyboard, and communication means 56. The signal receiving side device 60 is provided with standard sound data generating means 62, communication means 64, conversion means 66, and sound output means 68.

An example of transmitting sound from the sending side device 52 to the receiving side device 60 will be hereinafter described. First, label data and modification data shown in FIG. 22 are inputted from the data input means 54. The parts "\woman" and "\man" are modification data to determine the contents of sound quality conversion of the label data in the bracket {} following the modification data. In this embodiment, the symbol "\woman" means that the speech data is converted to a female voice and the symbol "\man" means that the speech data is changed to a male voice.

Next, the data are sent by the communication means 56 through the communication passage 50 to the receiving side device 60. The communication means 64 of the receiving side device 60 receives and temporarily holds the data. The standard sound data generating means 62 receives the held data and extracts label data only. Here, "ohayou gozaimasu" and "gokigen ikagadesuka" are extracted. The standard sound data generating means 62 generates according to the label data, standard sound data corresponding to the label data by means of sound synthesis method or the like.

On the other hand, the conversion means 66 takes out modification data only from the data held in the communication means 64. Here, the data "\woman" and "\man" are taken out. The conversion means 66 converts the sound quality of corresponding part of the standard sound data according to the modification data. The relationship between the modification data and the contents of the sound quality conversion is predetermined. Here, "ohayou gozaimasu" is converted to female voice data and "gokigen ikagadesuka" is converted to male voice data. The conversion means outputs data of converted sound quality obtained in this way.

The sound output means 68 converts the sound quality converted data into analog signals and outputs them through a loudspeaker.

In this way, sound is transmitted from the sending side device 52 to the receiving side device 60. With this embodiment, sound may be sent with a small amount of data; the label data and the modification data. Furthermore, not only the standard sound but intended quality of sound may be sent according to modification data.

With conventional devices, since sound data of a large amount are sent, transmission speed is slow. With the device of the invention, however, the transmission speed is drastically increased.

In the case the modification data are complicated, it may also be arranged that the modification data are attached with marks and stored in the receiving side device 60 so that the marks only are sent. For example, as shown in FIG. 23, a symbol "A" may be attached to data \BOLD\ITALIC\25 POINT and stored for convenience.

Furthermore, it may also be arranged to modify the label with the modification data as shown in the embodiment shown in FIG. 2 and displayed so as to make it possible to confirm what kind of modification data are attached to the label data.

Various variations, applications, and expansions described in reference to the embodiment shown in FIG. 2 may also be applied to this embodiment. For example, while the material of transmission is speech sound in this embodiment, the material may be any other sound in general.

What is claimed is:

1. A sound characteristic conversion device comprising;
   sound data obtaining means for obtaining sound data representative of a sound signal;
   sound-label data holding means for holding the sound data divided according to specified divisions and labels divided with division marks and showing the information transmitted with the sound represented with the sound data as characters, pictures, or symbols, with the labels associated with respective divisions of the sound data, display control means for visually modifying the labels based on the label data of corresponding divisions according to modification data when the modification data are given to the label data of divisions to which conversion of sound characteristic is intended, and causing display means to display the modified labels, and conversion means for applying characteristic conversion corresponding to the modification data to the sound data associated with the label data of the divisions according to the modification data given as corresponding to the label data of the divisions.

2. The sound characteristic conversion device of claim 1, characterized in that the visual modification of said labels is modification of characters of the labels.

3. The sound characteristic conversion device of claim 1, characterized in that the visual modification to the labels is the order of the labels.

4. A sound characteristic conversion device comprising;

sound data dividing means for dividing inputted sound data according to sound punctuation, label data dividing means for dividing label data which show the contents transmitted with the sound represented with the sound data as characters and symbols and to which division marks are attached as corresponding to the sound divisions according to the division marks, association forming means for associating the divided sound data with the divided label data, display control means for visually modifying the labels based on the label data according to modification data when the modification data are given to the label data, and causing display means to display the modified labels, and conversion means for applying characteristic conversion corresponding to the modification data to the sound data associated with the label data according to the modification data given as corresponding to the label data.

5. The sound characteristic conversion device of claim 4, characterized in that the visual modification to the labels is the order of the labels.

6. The storing medium for storing a program for executing the device or method according to any of the claims 1, 2, 3, 4, 5, by means of a computer.

7. The sound characteristic conversion device of claim 4, characterized in that the visual modification of said labels is modification of characters of the labels.

8. A sound characteristic conversion method characterized by:

obtaining sound data representative of a sound signal;

associating labels showing contents transmitted with the sound signal represented with the sound data as characters, pictures, or symbols in advance with the sound data, and as well as, associating the contents of sound characteristic conversion in advance with modification process, visually modifying the labels represented with the label data according to given modification process and displaying the modified labels, and applying characteristic conversion corresponding to the modification process given to the label data, to the sound data associated with the label data.

9. A sound characteristic conversion method characterized by:

dividing inputted sound data according to sound punctuation, dividing label data which show the information transmitted with the sound represented with the sound data as characters and symbols and to which division marks are attached as corresponding to the sound divisions according to the division marks, associating the divided label data with the divided sound data, visually modifying the labels based on the label data according to modification data when the modification data are given to the label data, and causing display means to display the modified labels, and conversion means for applying characteristic conversion corresponding to the modification data to the sound data associated with the label data according to the modification data given as corresponding to the label data.

10. A sound characteristic conversion device comprising;

sound data obtaining means for obtaining sound data representative of a sound signal;

sound-label data holding means for holding the sound data divided according to specified divisions and labels showing the information transmitted with the sound represented with the sound data as characters or symbols, with the labels associated with respective divisions of the sound data and divided with division marks, and conversion means for applying characteristic conversion corresponding to modification data to the sound data associated with the label data according to the modification data given as corresponding to the label data.

11. A sound characteristic conversion method characterized by:

obtaining sound data representative of a sound signal;

associating labels showing information transmitted with the sound signal represented with the sound data as characters or symbols with the sound data divided according to specified divisions and dividing the labels with division marks, and applying characteristic conversion corresponding to modification data to the sound data associated with the label data according to the modification data given as corresponding to the label data.

12. A sound data transmission system having a signal sending side device and a signal receiving side device capable of communicating through a communication passage for transmitting sound data from the signal sending side device to the signal receiving side device, characterized in that:

the signal sending side device comprises;
data inputting means for inputting label data divided into divisions with division marks and modification data associated with the divisions, and
communication means for transmitting the label data and the modification data through the communication passage to the signal receiving side device, and the signal receiving side device comprising;
communication means for receiving the label data and the modification data from the signal sending side device, standard sound data generation means for generating standard sound data according to the label data, and conversion means for converting sound characteristic of the standard sound data according to the modification data and generating sound characteristic conversion data.

13. A method of transmitting sound data from a sending side to a receiving side through a communication passage, characterized by:

on the sending side;

inputting label data divided into divisions with division marks and modification data associated with the divisions, transmitting the label data and the modification data to the receiving side through the communication passage, and on the receiving side;

receiving the label data and the modification data from the sending side, generating standard sound data according to the label data, and converting the sound characteristic of the standard sound data by means of the label data division associated with the modification data according to the modification data to generate data of converted sound characteristic.

14. A sound-label associating device comprising;

sound data inputting means for inputting sound data, sound data dividing means for dividing sound data according to the amplitude of sound pressure represented with the sound data, label data inputting means for associating sound data with labels showing information transmitted with the sound represented with the sound data as characters or symbols and for inputting the labels as label data to which division marks are attached at positions corresponding to the divisions in the sound data, label data dividing means for dividing the label data according to the division marks, and association forming means for associating the divided sound data with the divided label data.

15. The sound-label associating device of claim 14, characterized by further comprising detailed association forming means for associating the sound data with respective labels and dividing the sound data and the respective labels according to average duration of labels represented with the label data and duration of sound data concerning the label data and the sound data associated with each other by means of the association forming means.

16. A sound-label associating device comprising;

sound data inputting means for inputting sound data, label data inputting means for associating sound data with labels showing information transmitted with sound represented with sound data as characters or symbols and for inputting the labels as label data, and detailed association forming means for associating the sound data with respective labels and dividing the sound data and the respective labels according to previously obtained average duration of the labels represented with the label data and inputted actual duration of sound data.

17. A sound-label associating device characterized in that:

the device comprises;

sound data obtaining means for obtaining sound data representative of a sound signal;

a sound display area for visually displaying the acoustic feature of the sound signal represented with sound data, and a label display area for displaying labels represented with label data, whereby the division marks representing sound divisions are displayed in the sound display area.

18. A sound-label associating method characterized by:

obtaining sound data representative of a sound signal;

dividing the sound data according to the amplitude of the sound pressure represented with the sound data, receiving label data showing information transmitted with sound represented with sound data as characters or symbols with division marks attached to positions corresponding to the divisions in the sound data, and dividing the label data according to the division marks, and associating the divided sound data and the divided label.

19. The sound-label associating method of claim 18 characterized by:

preparing average duration for respective labels in advance, and concerning the label data and the sound data associated with each other, associating sound data with respective labels and dividing the sound data according to the average duration of respective labels represented with label data and the duration of the sound data.

20. A method of associating sound data with label data showing information transmitted with a sound signal represented with the sound data as characters or symbols characterized by:

obtaining the sound data representative of the sound signal;

preparing an average duration for each label in advance, and associating the sound data with respective labels represented with respective labels, and dividing the sound data according to previously obtained average duration of respective labels and actual duration of the sound data.

21. A displaying method for sound-label association, characterized by:

obtaining sound data representative of a sound signal;

providing a sound displaying area for visually displaying the acoustic feature of the sound signal represented with the sound data, and a label displaying area for displaying labels represented with label data, and displaying the division marks indicating sound divisions in the sound displaying area.

22. An article of manufacture comprising:

a computer usable medium having computer readable program code embodied therein configured to cause sound characteristic conversion, the computer readable program code in said article of manufacture comprising:

computer readable program code configured to cause a computer to obtain sound data representative of a sound signal;

computer readable program code configured to cause a computer to hold the sound data divided according to specified divisions and labels divided with division marks and showing information transmitted with the sound represented with the sound data as characters, pictures, or symbols, with the labels associated with respective divisions of the sound data;

computer readable program code configured to cause a computer to visually modify the labels based on the label data of corresponding divisions according to modification data when the modification data are given to the label data of divisions to which conversion of sound characteristic is intended and to display the modified labels; and computer readable program code configured to cause a computer to apply characteristic conversion corresponding to the modification data to the sound data associated with the label data of the divisions according to the modification data given as corresponding to the label data of the divisions.

23. The article of manufacture of claim 22 characterized in that the visual modification of said labels is modification of characters of the labels.

24. The article of manufacture of claim 22 characterized in that the visual modification to the labels is the order of the labels.

25. An article of manufacture comprising:

a computer usable medium having computer readable program code embodied therein configured to cause sound characteristic conversion, the computer readable program code in said article of manufacture comprising:

computer readable program code configured to cause a computer to divide inputted sound data according to sound punctuation;

computer readable program code configured to cause a computer to divide label data which show the contents transmitted with the sound represented with the sound data as characters and symbols and to which division marks are attached as corresponding to the sound divisions according to division marks;

computer readable program code configured to cause a computer to associate the divided sound data with the divided label data;

computer readable program code configured to cause a computer to visually modify the labels based on the label data according to modification data when the modification data are given to the label data and configured to cause display means to display the modified labels;

computer readable program code configured to cause a computer to apply characteristic conversion corresponding to the modification data to the sound data associated with the label data according to the modification data given as corresponding to the label data.

26. The article of manufacture of claim 25 characterized in that the visual modification of said labels is modification of characters of the labels.

27. An article of manufacture of claim 25 characterized in that the visual modification to the labels is the order of the labels.

28. An article of manufacture comprising:

a computer usable medium having computer readable program code embodied therein configured to cause sound characteristic conversion, the computer readable program code in said article of manufacture comprising:

computer readable program code configured to cause a computer to obtain sound data representative of a sound signal;

computer readable program code configured to cause a computer to associate labels showing contents transmitted with the sound signal represented with the sound data as characters, pictures, or symbols in advance with the sound data, and as well as, associating the contents of sound characteristic conversion in advance with modification process;

computer readable program code configured to cause a computer to visually modify the labels represented with the label data according to given modification process and displaying the modified labels, and;

computer readable program code configured to cause a computer to apply characteristic conversion corresponding to the modification process given to the label data, to the sound data associated with the label data.

29. An article of manufacture comprising:

a computer usable medium having computer readable program code embodied therein configured to cause sound characteristic conversion, the computer readable program code in said article of manufacture comprising:

computer readable program code configured to cause a computer to divide inputted sound data according to sound punctuation;

computer readable program code configured to cause a computer to divide label data which show the information transmitted with the sound represented with the sound data as characters and symbols and to which division marks are attached as corresponding to the sound divisions according to the division marks;

computer readable program code configured to cause a computer to associate the divided label data with the divided sound data;

computer readable program code configured to cause a computer to visually modify the labels based on the label data according to the modification data when the modification data are given to the label data and configured to cause display means to display the modified labels, and;

computer readable program code configured to cause a computer to apply characteristic conversion corresponding to the modification data to the sound data associated with the label data according to the modification data given as corresponding to the label data.

30. An article of manufacture comprising:

a computer usable medium having computer readable program code embodied therein configured to cause sound characteristic conversion, the computer readable program code in said article of manufacture comprising:

computer readable program code configured to cause a computer to obtain sound data representative of a sound signal;

computer readable program code configured to cause a computer to hold the sound data divided according to specified divisions and labels showing the information transmitted with the sound represented with the sound data as characters or symbols, with the labels associated with respective divisions of the sound data and divided with division marks, and computer readable program code configured to cause a computer to apply characteristic conversion corresponding to modification data to the sound data associated with the label data according to the modification data given as corresponding to the label data.

31. An article of manufacture comprising:

a computer usable medium having computer readable program code embodied therein configured to cause sound characteristic conversion, the computer readable program code in said article of manufacture comprising:

computer readable program code configured to cause a computer to obtain sound data representative of a sound signal;

computer readable program code configured to cause a computer to associate labels showing information transmitted with the sound signal represented with the sound data as characters or symbols with the sound data divided according to specified divisions and dividing the labels with division marks, and computer readable program code configured to cause a computer to apply characteristic conversion corresponding to modification data to the sound data associated with the label data according to the modification data given as corresponding to the label data.

32. An article of manufacture comprising:

a computer usable medium having computer readable program code embodied therein configured to cause sound data transmission, the computer readable program code in said article of manufacture comprising:

computer readable program code configured to cause a computer to send label data and modification data through a communication passage for transmitting sound data, said computer readable program code comprising:

computer readable program code configured to cause a computer to input label data divided into divisions with division marks and modification data associated with the divisions, and computer readable program code configured to cause a computer to transmit the label data and the modification data through the communication passage; and computer readable program code configured to cause a computer to receive the label data and the modification data through said communication passage, said computer readable program code comprising:

computer readable program code configured to cause a computer to generate standard sound data according to the label data, and computer readable program code configured to cause a computer to convert sound characteristic of the standard sound data according to the modification data and generating sound characteristic conversion data.

33. An article of manufacture comprising:

a computer usable medium having computer readable program code embodied therein configured to cause sound data transmission through a communication passage, the computer readable program code in said article of manufacture comprising:

computer readable program code configured to cause a computer to input label data divided into divisions with division marks and modification data associated with the divisions;

computer readable program code configured to cause a computer to transmit the label data and the modification data through the communication passage;

computer readable program code configured to cause a computer to receive the label data and the modification data through the communication passage;

computer readable program code configured to cause a computer to generate standard sound data according to the label data, and computer readable program code configured to cause a computer to converting the sound characteristic of the standard sound data by means of the label data division associated with the modification data according to the modification data to generate data of converted sound characteristic.

34. An article of manufacture comprising:

a computer usable medium having computer readable program code embodied therein configured to cause sound-label association, the computer readable program code in said article of manufacture comprising:

computer readable program code configured to cause a computer to input sound data;

computer readable program code configured to cause a computer to divide the sound data according to the amplitude of sound pressure represented with the sound data;

computer readable program code configured to cause a computer to associate sound data with labels transmitted with the sound data, said labels showing information represented as characters or symbols, and to input the labels as label data to which division marks are attached at positions corresponding to the divisions in the sound data;

computer readable program code configured to cause a computer to divide the label data according to the division marks, and computer readable program code configured to cause a computer to associate the divided sound data with the divided label data.

35. The article of manufacture of claim 34, wherein the computer readable program code in said article of manufacture further comprises:

computer readable program code configured to cause a computer to associate the sound data with respective labels and to divide the sound data and the respective labels according to average duration of labels represented with the label data and duration of sound data concerning the label data and the sound data associated with each other by means of the association forming means.

36. An article of manufacture comprising:

a computer usable medium having computer readable program code embodied therein configured to cause sound-label association, the computer readable program code in said article of manufacture comprising:

computer readable program code configured to cause a computer to input sound data;

computer readable program code configured to cause a computer to associate sound data with labels showing information transmitted with sound represented with sound data as characters or symbols and to input the labels as label data; and computer readable program code configured to cause a computer to associate the sound data with respective labels and dividing the sound data and the respective labels according to previously obtained average duration of the labels represented with the label data and inputted actual duration of sound data.

37. An article of manufacture comprising:

a computer usable medium having computer readable program code embodied therein configured to cause sound-label association, the computer readable program code in said article of manufacture comprising:

computer readable program code configured to cause a computer to obtain sound data representative of a sound signal;

computer readable program code configured to cause a computer to visually display the acoustic feature of the sound signal represented with sound data; and computer readable program code configured to cause a computer to display labels represented with label data, whereby the division marks representing sound divisions are displayed in the sound display area.

38. An article of manufacture comprising:

a computer usable medium having computer readable program code embodied therein configured to cause sound-label association, the computer readable program code in said article of manufacture comprising:

computer readable program code configured to cause a computer to obtain sound data representative of a sound signal;

computer readable program code configured to cause a computer to divide the sound data according to the amplitude of the sound pressure represented with the sound data;

computer readable program code configured to cause a computer to receive label data transmitted with sound data, said label data showing information represented as characters or symbols with division marks attached to positions corresponding to the divisions in the sound data, and to divide the label data according to the division marks, and computer readable program code configured to cause a computer to associate the divided sound data and the divided label.

39. The article of manufacture of claim 38, wherein the computer readable program code in said article of manufacture further comprises:

a computer usable medium having computer readable program code embodied therein configured to cause sound-label association, the computer readable program code in said article of manufacture comprising:

computer readable program code configured to cause a computer to prepare average duration for respective labels in advance, and computer readable program code configured to cause a computer to associate sound data with respective labels and to divide the sound data according to the average duration of respective labels represented with label data and the duration of the sound data.

40. An article of manufacture comprising:

a computer usable medium having computer readable program code embodied therein configured to cause association of sound data with label data showing information transmitted with a sound signal represented with the sound data as characters or symbols, the computer readable program code in said article of manufacture comprising:

computer readable program code configured to cause a computer to obtain the sound data representative of the sound signal;

computer readable program code configured to cause a computer to prepare an average duration for each label in advance, and;

computer readable program code configured to cause a computer to associate the sound data with respective labels represented with respective labels and to divide the sound data according to previously obtained average duration of respective labels and actual duration of the sound data.

41. An article of manufacture comprising:

a computer usable medium having computer readable program code embodied therein configured to cause displaying for sound-label association, the computer readable program code in said article of manufacture comprising:

computer readable program code configured to cause a computer to obtain sound data representative of a sound signal;

computer readable program code configured to cause a computer to provide a sound displaying area for visually displaying the acoustic feature of the sound signal represented with the sound data and a label displaying area for displaying labels represented with label data, and computer readable program code configured to cause a computer to display the division marks indicating sound divisions in the sound displaying area.

* * * * *